(12) United States Patent
Oztekin et al.

(10) Patent No.: US 8,645,390 B1
(45) Date of Patent: Feb. 4, 2014

(54) REORDERING SEARCH QUERY RESULTS IN ACCORDANCE WITH SEARCH CONTEXT SPECIFIC PREDICTED PERFORMANCE FUNCTIONS

(75) Inventors: Bilgehan Uygar Oztekin, Mountain View, CA (US); Daria Antonova, Mountain View, CA (US); Kedar Dhamdhere, Sunnyvale, CA (US); Finnegan Southey, Mountain View, CA (US); Zhenyu Mao, San Jose, CA (US)

(73) Assignee: Google Inc., Mountain View, CA (US)

( * ) Notice: Subject to any disclaimer, the term of this patent is extended or adjusted under 35 U.S.C. 154(b) by 986 days.

(21) Appl. No.: 12/187,776

(22) Filed: Aug. 7, 2008

Related U.S. Application Data

(60) Provisional application No. 60/969,498, filed on Aug. 31, 2007.

(51) Int. Cl.
*G06F 7/00* (2006.01)
*G06F 17/00* (2006.01)
*G06F 17/30* (2006.01)

(52) U.S. Cl.
USPC ............................ 707/748; 707/721; 707/722

(58) Field of Classification Search
USPC ........................................ 706/46; 705/7, 104
See application file for complete search history.

(56) References Cited

U.S. PATENT DOCUMENTS

| | | | | |
|---|---|---|---|---|
| 6,236,978 B1 * | 5/2001 | Tuzhilin | ............................ | 705/7 |
| 6,484,164 B1 | 11/2002 | Nikolovska et al. | .............. | 707/3 |
| 6,701,311 B2 * | 3/2004 | Biebesheimer et al. | .............. | 1/1 |
| 7,197,497 B2 | 3/2007 | Cossock | ............................ | 707/3 |
| 7,225,200 B2 * | 5/2007 | Chickering et al. | .................. | 1/1 |
| 7,516,113 B2 * | 4/2009 | Horvitz et al. | .................. | 706/46 |
| 7,548,929 B2 * | 6/2009 | Collins et al. | ......................... | 1/1 |
| 7,631,008 B2 * | 12/2009 | Carson et al. | .............. | 705/14.45 |
| 2005/0131762 A1 * | 6/2005 | Bharat et al. | .................... | 705/14 |

OTHER PUBLICATIONS

Oztekin, B. et al., "Expert Agreement and Content Based Reranking in a Meta Search Environment using Mearf," http://wwww2002.org/CDROM/refereed/520, May 7, 2002, pp. 1-22.

\* cited by examiner

*Primary Examiner* — Susan Chen

(74) *Attorney, Agent, or Firm* — Morgan, Lewis & Bockius LLP

(57) ABSTRACT

A method of processing a search query includes, for each search context of a plurality of search contexts, for each scoring primitive of a plurality of scoring primitives, and for a set of previously executed search queries that are consistent with the search context, determining a correlation between the scoring primitive and actual user selections of results of the previously executed search queries by a plurality of users. For each search context, machine learning is performed on the correlations to identify a predicted performance function comprising a weighted subset of the scoring primitives that meet predefined predictive quality criteria. Executing a user submitted search query includes associating the user submitted search query with a respective search context, and ordering at least a portion of the search results in accordance with the predicted performance function for the search context for the user submitted search query.

52 Claims, 11 Drawing Sheets

REORDERING SEARCH QUERY RESULTS IN ACCORDANCE WITH SEARCH CONTEXT SPECIFIC PREDICTED PERFORMANCE FUNCTIONS

RELATED APPLICATIONS

This application claims priority under 35 U.S.C. 119 to U.S. Provisional Patent Application 60/969,498, filed Aug. 31, 2007, "Reordering Search Query Results in Accordance with Search Context Specific Predicted Performance Functions," which is hereby incorporated by reference in its entirety.

TECHNICAL FIELD

The present invention relates generally to the field of search engines and in particular to systems and methods of personalizing search results based on the search history of the searcher.

BACKGROUND

Search engines are powerful tools for locating and retrieving documents from the Internet or other network. Traditionally, different users who submit the same search query to a search engine receive the same set of search results. For example, the search engine generates the same set of search results for the search query "apple" irrespective of whether the search query is from a user who is interested in APPLE computers or from a user who is interested in the fruit *malus domestica*. Clearly such search results are likely to include some results of little interest to either user.

In view of the aforementioned, it would be desirable to have a search engine that customizes its search results to highlight those items in the search results that are most likely to be of interest to the searcher. Further, it would be desirable for such a system to operate without explicit input from the searcher regarding personal preferences and interests.

SUMMARY

A method of processing a search query includes, for each search context of a plurality of search contexts, for each scoring primitive of a plurality of scoring primitives, and for a set of previously executed search queries that are consistent with the search context, determining a correlation between the scoring primitive and actual user selections of results of the previously executed search queries by a plurality of users. In some embodiments, a search context is a value, or a set of values indicative of a user context (e.g., a group that the user belongs to), or query context (e.g., a class that the search query belongs to), or both. For each search context, machine learning is performed on the correlations to identify a predicted performance function comprising a weighted subset of the scoring primitives that meet predefined predictive quality criteria, wherein the identified predicted performance function is associated with the search context. The method furthermore includes receiving and executing a user submitted search query, submitted by a user, to produce a set of search results, including associating the user submitted search query with a respective search context of the plurality of search contexts, and ordering at least a portion of the search results in accordance with the identified predicted performance function for the search context associated with user submitted search query.

In another aspect of the invention, a system includes one or more processors, memory, and one or more programs stored in the memory to be executed by the one or more processors. The one or more programs include instructions for processing a search query, including instructions for determining a correlation, for each search context of a plurality of search contexts, for each scoring primitive of a plurality of scoring primitives, and for a set of previously executed search queries that are consistent with the search context, between the scoring primitive and actual user selections of results of the previously executed search queries by a plurality of users. The one or more programs further include instructions for performing machine learning, for each search context, on the correlations to identify a predicted performance function comprising a weighted subset of the scoring primitives that meet predefined predictive quality criteria, wherein the identified predicted performance function is associated with the search context. The one or more programs also include instructions for receiving and executing a user submitted search query, submitted by a user, to produce a set of search results, including associating the user submitted search query with a respective search context of the plurality of search contexts, and ordering at least a portion of the search results in accordance with the identified predicted performance function for the search context associated with user submitted search query.

BRIEF DESCRIPTION OF THE DRAWINGS

Like reference numerals refer to corresponding parts throughout the drawings.

DESCRIPTION OF EMBODIMENTS

A detailed description will now be made with reference to various embodiments, examples of which are illustrated in the accompanying drawings. In the following description, numerous specific details are set forth in order to provide a thorough understanding of the subject matter presented herein. However, it should be apparent to one of ordinary skill in the art that the described embodiments may be practiced without including all of the specific details described herein. In other instances, well-known methods, procedures, components, and circuits have not been described in detail so as not to unnecessarily obscure certain aspects of the embodiments.

Figure 1:
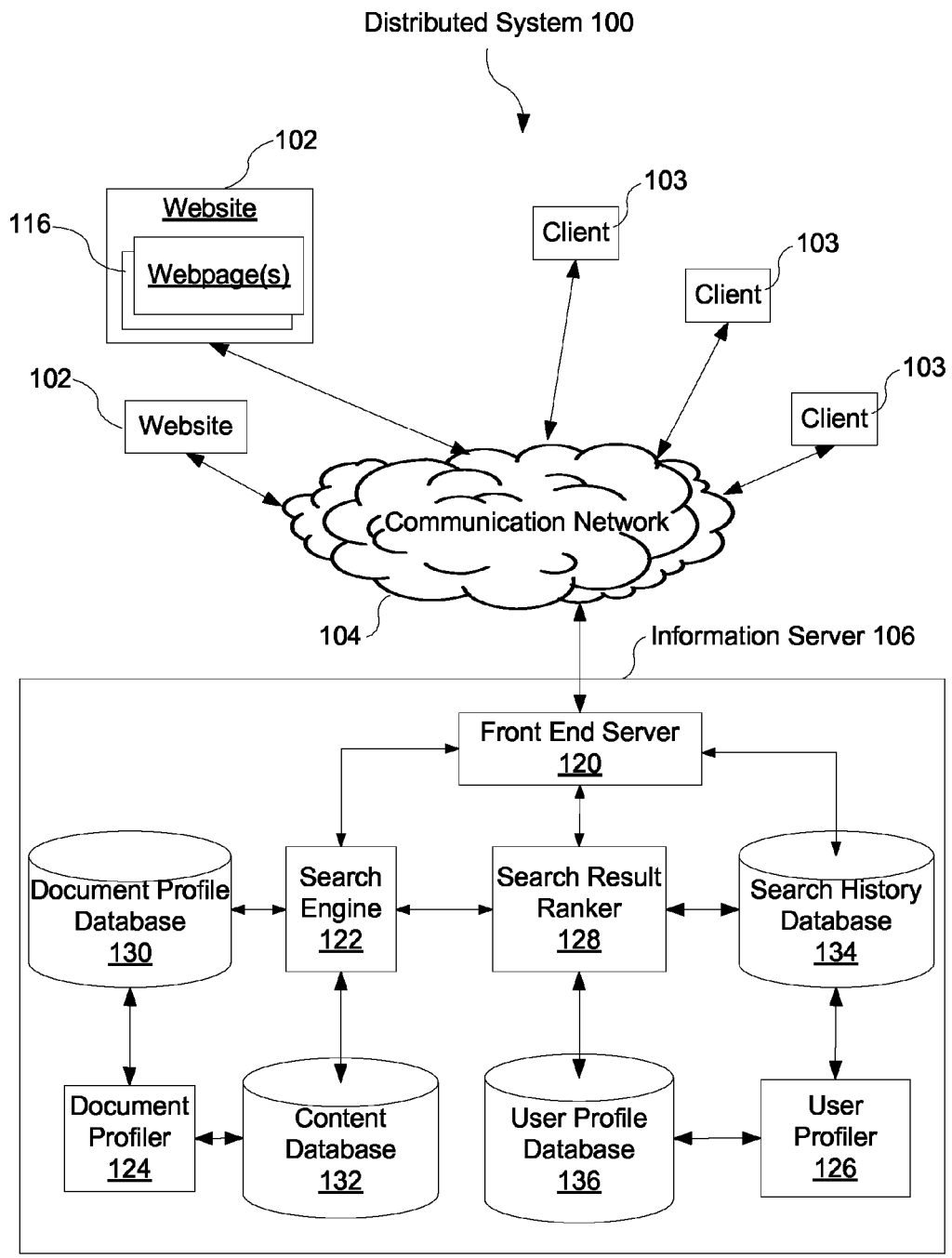
FIG. 1 is a block diagram of an exemplary distributed system that includes a plurality of clients configured to request information from an information server, in accordance with some embodiments.

FIG. 1 is a block diagram of an exemplary distributed system 100 for implementing some embodiments of the present invention. One or more computer devices hosting websites 102 and one or more clients 103 are connected to an information server 106 via a communication network 104. The information server 106 may include a front end server 120, a search engine 122, a document profiler 124, a user profiler 126, a search result ranker 128, a document profile database 130, a content database 132, a search history database 134, and a user profile database 136, some of which are described in more detail below.

In some embodiments, the information server 106 contains a subset or superset of the components illustrated in FIG. 1. Although FIG. 1 shows the information server 106 as a number of discrete items, the Figure is intended more as a functional description of the various features which may be present in the information server 106 rather than a structural schematic of the various embodiments. In practice, items shown separately could be combined and some items could be further separated, as would be recognized by one of ordinary skill in the art of designing such systems. For example, the four different databases 130, 132, 134, and 136 shown separately in the Figure could be implemented by one, two, or more distinct databases spread over as many servers as needed to store and provide timely access to the data in the databases. The actual number of computers constituting the information server 106 and the allocation of features among the computers may vary from one implementation to another, and may depend in part on the amount of traffic that the information server 106 handles during peak usage periods as well as during average usage periods. An exemplary information server 106 is described in greater detail below with reference to FIG. 3A.

A website 102 is typically a collection of webpages and/or other documents 116 associated with a domain name or public address on the Internet. Alternately, the webpages and other documents 116 may be located on servers within other networks (e.g., a private network, which may include one or more local area networks, wide area networks, etc.). Each website (or webpage) has a universal resource locator (URL) that uniquely identifies the location of the website (or webpage) on the Internet. Users of the clients 103 can visit a respective website by entering its URL in a browser window. A website may be hosted by a web server exclusively owned by the owner of the domain name or by an Internet service provider that manages multiple websites associated with different domain names. Depending on the context, the term "website" as used in this document refers to a logical location (e.g., an Internet or intranet location) identified by a network address (e.g., URL), or it refers to a web server hosting the website represented by the network address. Some "websites" may be distributed over multiple Internet or network locations, but have a shared web server hosting those locations, and in many situations it is logical to consider those network locations to all be part of "a website."

A client 103 may be any of a number of computer devices (e.g., a computer, an internet kiosk, a personal digital assistant, a cell phone, a gaming device, a desktop computer, or a laptop computer). An exemplary client system 103 is described in greater detail below with reference to FIG. 2A.

The communication network 104 may be any wired or wireless local area network (LAN) and/or wide area network (WAN), such as an intranet, an extranet, or the Internet. The communication network 104 facilitates communications between the websites 102, the clients 103 and the information server 106. In some embodiments, the communication network 104 uses the HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to a unit of information or a service that is accessible via a URL and can be, for example, a webpage, a document, a database, an image, a computational object, a search engine, or other online information service.

Figure 2A:
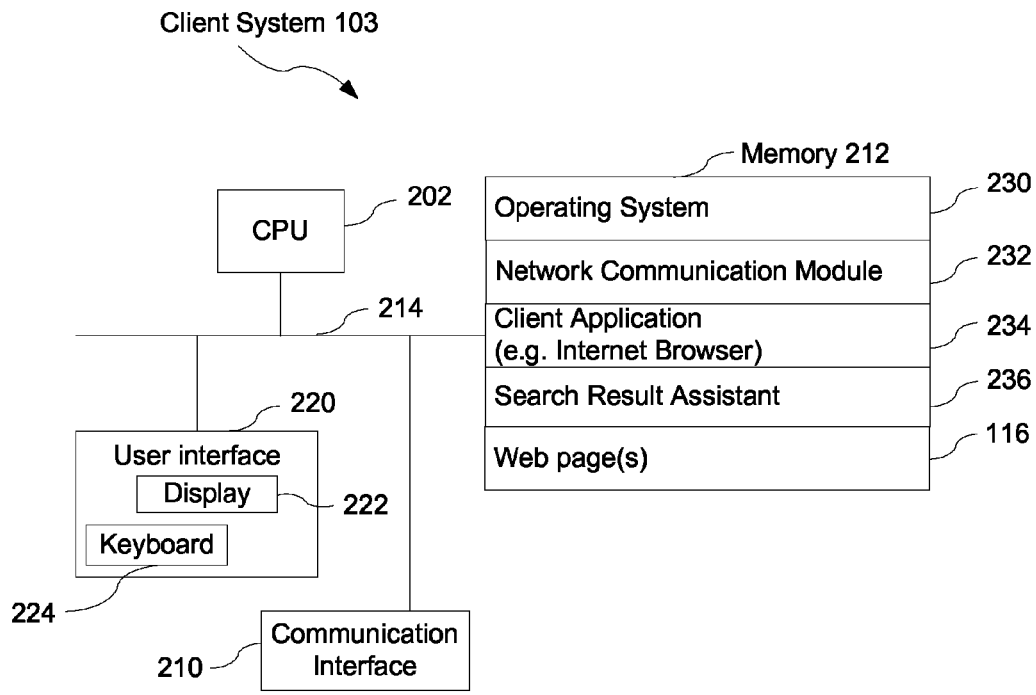
FIG. 2A is a block diagram of the client system of FIG. 1.

FIG. 2A is a block diagram of a client system 103. The system 103 generally includes one or more processing units (CPU's) 202, one or more network or other communications interfaces 210, memory 212, and one or more communication buses 214 for interconnecting these components. The communication buses 214 may include circuitry (sometimes called a chipset) that interconnects and controls communications between system components. The client system 103 may optionally include a user interface 220, for instance a display 222 and a keyboard 224. Memory 212 may include high speed random access memory and may also include non-volatile memory, such as one or more magnetic disk storage devices. Memory 212 may include mass storage that is remotely located from the central processing unit(s) 202. Memory 212, or alternately the non-volatile memory device(s) within memory 212, comprises a computer readable storage medium that stores one or more programs, as described in more detail below.

The client system can include an operating system 230, a network communication module 232, a client application 234, and a search result assistant 236. The client application 234 can be a software application that permits a user to interact with the client 103 and/or network resources to perform one or more tasks. For example, the client application 234 can be a browser (e.g., the computer program available under the trademark FIREFOX) or other type of application that permits a user to search for, browse, and/or use resources (e.g., webpages and web services) at the website 102 from the client 103.

The search result assistant 236 can be a software application that performs one or more tasks related to monitoring or assisting a user's activities with respect to the client application 234 and/or other applications. In some embodiments the search result assistant 236 is part of the client application 234, available as a plug-in, add-on, or extension to the client application 234 (provided, for example, from various online sources), while in other embodiments the search result assistant 236 is a stand-alone program separate from the client application 234. In some embodiments the search result assistant 236 is embedded in one or more documents 116 or other documents downloaded from one or more servers, such as the information server 106. Client memory 212 can store information such as documents 116 received from the information server 106, system information, and/or information about a user. In some embodiments, the search result assistant 236 includes executable instructions, stored in the webpage(s) containing the search results, for monitoring the user's activities with respect to the search results and transmitting information about the monitored user activities back to the information server 106.

Figure 2B:
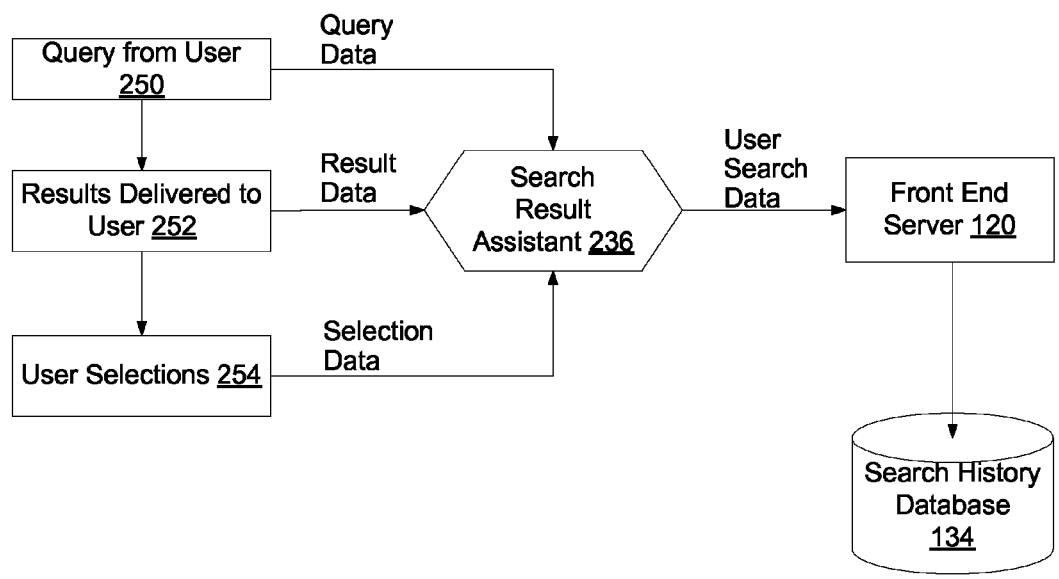
FIG. 2B is a flow chart of a process for collecting data concerning a search request and generating search results, in accordance with some embodiments.

FIG. 2B is a flow chart of a process for collecting data concerning a search request and generating search results. The process of collecting such data may be performed by the search result assistant 236 (FIG. 2A). To receive a set of personalized search results, a user from the client 103 (FIG. 1) (for example) submits a search request to the information server 106 (FIG. 1). In some embodiments, the search request may include a search query 250 (a "query from user" 250) comprising one or more query terms and unique identifiers of one or more of the following entities: the requesting user and the requesting client 103.

As shown in FIG. 2B, in some embodiments the search result assistant 236 processes information entered by a user at the client 103 (FIG. 1) (e.g., processes the search query from the user 250); processes information received from the information server 106 (FIG. 1) (e.g., results delivered to the user 252); and/or monitors the user's activities on the search results (e.g., a user selecting a particular search result 254). The user's activities on the search results, sometimes called "user selections" may include: the selection of a document link, sometimes called "clicking" on a search result, and optionally the "dwell time" for a document selected by the user, where "dwell time" is a measure of the amount of time between the user selection of the corresponding URL link and the user exiting from the document (e.g., by returning to the search results page or by initiating a new search). The "user selections" may also be based on mouse hovering time over a document link, bookmarking a document link, or the like.

The search result assistant 236 (FIGS. 2A, 2B) may collect and store the user search data, which may include: query data, result data and selection data, or a subset or superset of such data. In some embodiments, the search result assistant 236 sends the user search data to the information server 106 (FIG. 1) for storage in a search history database 134 (FIG. 1). In the embodiment shown in FIGS. 1 and 2B, the front end server 120 of the information server 106 sends the user search data to the search history database 134. User activity data stored in this way may become part of a user search history record, the composition of which is described in greater detail below with reference to FIG. 4.

Figure 3A:
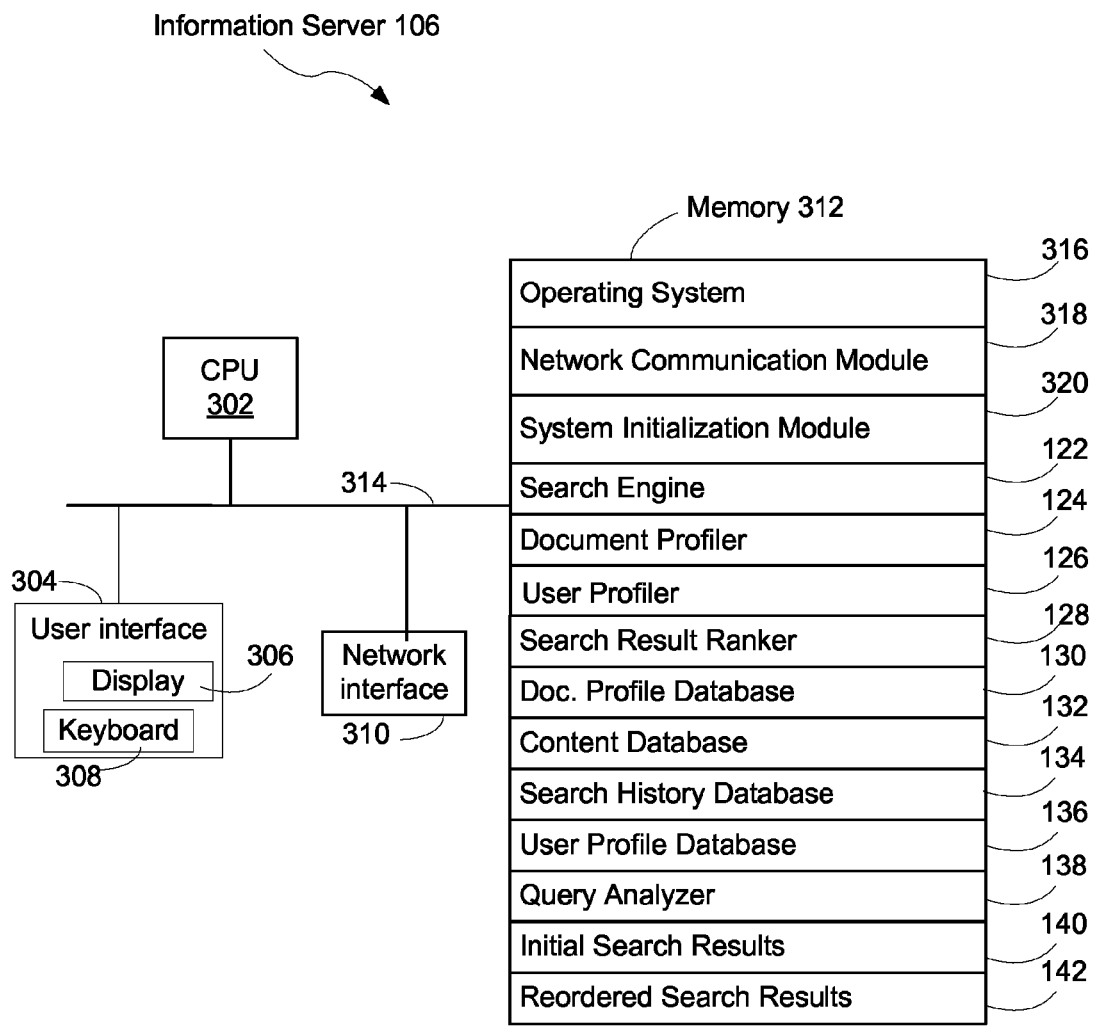
FIG. 3A is a block diagram of the information server of FIG. 1 in accordance with some embodiments.

FIG. 3A is a block diagram illustrating an information server 106 in accordance with one embodiment of the present invention. The information server 106 typically includes one or more processing units (CPU's) 302, one or more network or other communications interfaces 310, memory 312, and one or more communication buses 314 for interconnecting these components. The information server 106 (FIG. 1) optionally may include a user interface 304 comprising a display device 306 and a keyboard 308. Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 may optionally include one or more storage devices remotely located from the CPU(s) 302. Memory 312, or alternately the non-volatile memory device(s) within memory 710, comprises a computer readable storage medium. In some embodiments, memory 312 stores the following programs, modules and data structures, or a subset thereof: an operating system 316; a network communication module 318; a system initialization module 320; a search engine 122; a document profiler 124; a user profiler 126; a search result ranker 128; a document profile database 130; a content database 132; a search history database 134; a user profile database 136; and a query analyzer 138. The operating system 316 includes procedures for handling various basic system services and for performing hardware dependent tasks. The network communication module 318 is used for connecting the information server 106 to other computers via the one or more communication network interfaces 310 and one or more communication networks, such as the Internet, other wide area networks, local area networks, metropolitan area networks, and so on.

Within the information server 106 (FIG. 1), the front end server 120 is configured to handle search requests from the clients 103 via their respective connections with the communication network 104. As shown in FIG. 1, the front end server 120 is connected to the search engine 122 and the search engine 122 is connected to the content database 132, respectively. The content database 132 stores a plurality of indexed documents retrieved from different websites 102. Alternately, or in addition, the content database 132 stores an index of documents stored at various websites 102. In some embodiments, each indexed document is assigned a page rank according to the document's link structure. The page rank serves as a query-independent metric of the document's popularity. Alternately, the page rank serves as a query-independent metric of the document's importance.

In some embodiments, the front end server 120 passes the search query onto the search engine 122. The search engine 122 then communicates with the content database 132 and the document profile database 130 to select a plurality of information items (e.g., documents) in response to the search query. In some embodiments, the search engine 122 assigns a generic ranking score to each information item based on the item's page rank, the relevant text in the information item, and the search query. The generic ranking score is a requestor-independent (also called "user-independent") indicator of the information item's relevance to the search query.

For ease of discussion, information items will often be referred to as "documents;" but it is to be understood that information items need not be documents, and may include other types or forms of information. The search engine 122 sends to the search result ranker 128 a list of search results (initial search results 140) responsive to the search query, each search result including at least a URL identifying the source of a relevant document on the Internet and the document's generic ranking score. In some embodiments, the list of search results (initial search results 140) is ordered by their respective generic ranking scores such that each search result has an initial position in the list. For example, the search result having the highest ranking score is at the top or head of the list and the search result having the lowest ranking score is at the bottom or tail of the list. The search result ranker is described in greater detail below, with reference to FIG. 3B.

In some embodiments, the query analyzer 138 (FIG. 3A) receives search queries from the front end server 120 (FIG. 1) and analyzes the queries to determine the "query context" associated with the search query. Query context is described in more detail below. The query analyzer 138 may then send information indicative of the identified query context to the search result ranker 128 (FIGS. 1 and 3A).

While the above description divides tasks in a particular way among the search engine 122, the search result ranker 128, the query analyzer 138, and the front end server 120, this particular division of tasks is exemplary, and other divisions may be used in other embodiments. In some embodiments, the search result ranker 128 may be merged into the search engine 122. In yet other embodiments, other divisions of tasks or modules may be provided.

To serve a list of search results of best fit for a particular user, the user's user profile should capture the user's search interests when the user submits a search query. Besides search queries, a user's search interests may be reflected by the websites, domains, particular URLs, or types of web pages that the user visits frequently (where "types of web pages" can be determined in accordance with any suitable classification scheme). For example, a user who often visits consumer electronics websites will likely have a user profile that expresses or captures the user's interest in webpages related to consumer electronic products while a user who pays frequent visits to on-line grocery stores will likely have a user profile that expresses or captures the user's interest in webpages relating to grocery stores and cooking. Since a user's search interests may vary over time, the user's user profile should be updated from time to time (e.g., periodically) to keep track of the user's current search interests.

Referring to FIG. 1, the user profiler 126 is responsible for generating and maintaining user profiles for users of the information server 106. To capture a user's current search interests, the user profiler 126 may need to access the user's search history that is stored in the search history database 134. A user's search history may include the last N search queries submitted by the user, the search results presented to the user in response to the search queries, and the user's activities (as described previously with reference to FIG. 2B) on the search results collected by the search result assistant 236. The composition of an exemplary user search history record stored in the search history database 134, in accordance with some embodiments, is described below with reference to FIG. 4.

In some embodiments, at predefined times, the user profiler 126 is invoked to generate a user profile from a user search history record 400 in the search history database 134. In some embodiments, this process is performed offline, e.g., when the user is not busy searching. The user profile is then stored in the user profile database 136 and associated with a particular user identifier. In some embodiments, the user profile database 136 may include multiple user profiles associated with the same user identifier. For example, some user profiles are responsible for promoting certain search results that the user is more likely to select, while other user profiles are responsible for demoting certain search results if they are less likely to be chosen by the user. Alternately, or in addition, a user may have a user profile for work and another for personal (or non-work) searches and activities.

In some embodiments, information used for profiling a user may include the number of "clicks" or visits by the user to a particular website, webpage, or set of websites during a particular window in time. Other characteristics of user behavior that can be used for user profiling include one or more of the following: the length of time that a user interacts with the website, the proportion of the website viewed by the user, actions (in addition to clicks) taken by a user while visiting the website (e.g., printing, bookmarking, cutting and pasting, annotating), and a user's activity subsequent to the interaction with the website.

In some embodiments, a user profile is created based on dated information in the user's search history, with older information receiving a lower weight than newer information. For example, the information for each successively older time period may be down-weighted by a predefined scaling factor. Information from a period that is more than N (e.g., a value between 5 and 20) periods old has less than half the impact on the user profile as information from the current period.

Each of the above identified elements may be stored in one or more of the previously mentioned memory devices, and corresponds to a set of instructions for performing the function(s) described above. The above identified modules or programs (i.e., sets of instructions) need not be implemented as separate software programs, procedures or modules, and thus various subsets of these modules may be combined or otherwise re-arranged in various embodiments. In some embodiments, memory 312 may store a subset of the modules and data structures identified above. Furthermore, memory 312 may store additional modules and data structures not described above.

Although FIG. 3A shows an "information server," FIG. 3A is intended more as a functional description of the various features, which may be present in a set of servers, than as a structural schematic of the embodiments described herein. In practice, and as recognized by those of ordinary skill in the art, items shown separately could be combined some items could be separated. For example, some items shown separately in FIG. 3A could be implemented on a single server or on one or more servers. The actual number of servers used to implement an information server and how features are allocated among them will vary from one implementation to another, and may depend in part on the amount of data traffic that the system must handle during peak usage periods as well as during average usage periods.

Figure 3B:
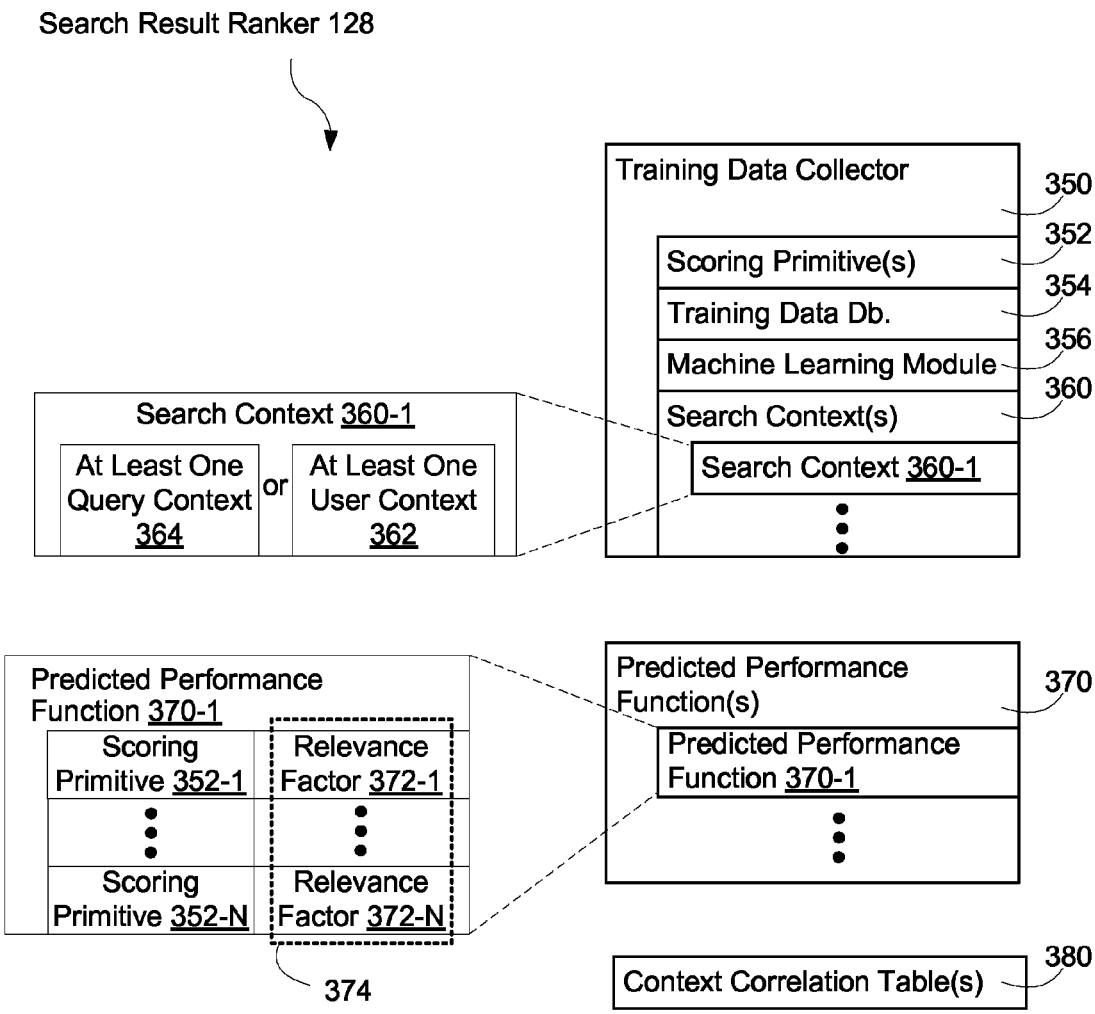
FIG. 3B is a block diagram of the search result ranker of FIG. 1 in accordance with some embodiments.

FIG. 3B is a block diagram illustrative of the search result ranker 128, in accordance with one embodiment. The search result ranker 128 contains a training data collector 350, which includes one or more scoring primitives 352, a training data database 354, a machine learning module 356, and one or more search contexts 360.

A respective scoring primitive 352 is a computer program (or a portion of a computer program or set of computer programs) that provides an output suggestive of the relevance, to a particular user, of a given search result retrieved in response to the user's search request. The output of the scoring primitive 352 is based on at least one element of the search context (as described below). A respective scoring primitive 352 corresponds to a scale of which results might be more relevant to the user, given a particular search context (e.g., if the user has an interest in computers and has executed a search including the term "apple," then some scoring primitive 352 might rank results for APPLE computers more highly that results for the fruit *malus domestica*). Other examples of scoring primitives 352 include: a length of the search query (e.g., the number of terms or non-noise words in the search query); a score produced by the search engine for initially ranking or ordering the search results; a function that, when applied to a particular search result, outputs a count or other numeric value corresponding to the number of topics associated with the search result that match topics of interest to the user (in accordance with the user profile and/or the user context).

A search context 360 is a value, or a set of values (e.g., a tuple) indicative of a user context 362 (e.g., a group that the user belongs to), or query context 364 (e.g., a class that the search query belongs to), or both. The user context 362 may include values associated with or representative of user demographics, such as user language, user country, or it may include one or more parameters of a user profile. In some embodiments, the user context 362 includes geographic information determined from the IP address from which the search query is received. In some embodiments, the user context 362 includes "recent history" information, such as any user queries submitted and any user clicks (i.e., documents or URLs that the user has viewed) in a predefined period of time immediately preceding the search query that is currently being processed, to the extent that such "recent history" information is available to the search result ranker 128. The query context 364 may be a measure of vagueness (e.g., the number of search terms in a search query) or a category of the query (e.g., a search including the word "price," may be placed in the category or class of commercial queries, which may include items for sale, items for rent, and other queries of a commercial nature). A search context 360 comprises at least one user context 362 or query context 364, or combination thereof. Alternatively, or in addition, the search context 360 may comprise other types of contexts such as property context (e.g., video, book search, Orkut). The search context 360 may comprise any combination of the above types of contexts (e.g., user context and query context, user context and property context, etc.). The search result ranker may also contain one or more predicted performance functions 370 and one or more context correlation tables 380.

In any search, there might be a plurality of relevant search contexts 360, including for example, the interests of the user, the group that the user is part of, the nature of the query, or the ambiguity of the query. For each context, there could be one or more scoring primitives 352 that would provide an output suggestive of the relevance of each result. In order to produce a set of re-rankings it is necessary to combine the outputs of the scoring primitives 352 into a single predicted performance function 370 (i.e., a weighted combination of scoring primitives 370). In some embodiments, the relative weight of each scoring primitive 352 is determined by an associated relevance factor 372 (e.g., scoring primitive 352-2 is associated with relevance factor 372-2). Each relevance factor 372 is a quantity, which may be determined by machine learning (or otherwise), which indicates the relevance of a corresponding scoring primitive to a search context.

In accordance with some embodiments, the training data collector 350 analyzes data (which may be called observed performance data or information) stored in search history records in order to identify a plurality of predicted performance functions 370 (each of which corresponds to a weighted subset of scoring primitives 352) that meet predefined predictive quality criteria, and a plurality of search contexts 360 associated with those predicted performance functions 370. In these embodiments the predicted performance function(s) 370 are associated with search contexts 360 by the context correlation table(s) 380. The method by which the predicted performance functions are identified is described in greater detail below, with reference to FIGS. 5A-5C. As described in more detail elsewhere, in the methods represented by FIGS. 5A-5C, a separate predicted performance function is determined for each distinct context, and thus different prediction "models" are generated for different contexts.

In accordance with some embodiments, the training data collector 350 analyzes data stored in the search history records (e.g., of a user, or a group of users) in order to identify a predicted performance function 370, which is (or includes) a weighted subset of the scoring primitives that meet predefined predictive quality criteria, and a plurality of relevance factor sets 374 (e.g., {relevance factor 372-1, . . . , relevance factor 372-N}), and a plurality of search contexts 360 associated with the relevance factor sets. The method by which this predicted performance function is identified is described in greater detail below, with reference to FIGS. 6A-6C. The one or more predicted performance functions 370 identified by the training data collector 350 are stored in search result ranker 128. In these embodiments the relevance factor sets 374 (e.g., {relevance factor 372-1, . . . , relevance factor 372-N}) are associated with search contexts 360 by the context correlation table(s) 380.

Search History Database

Figure 4:
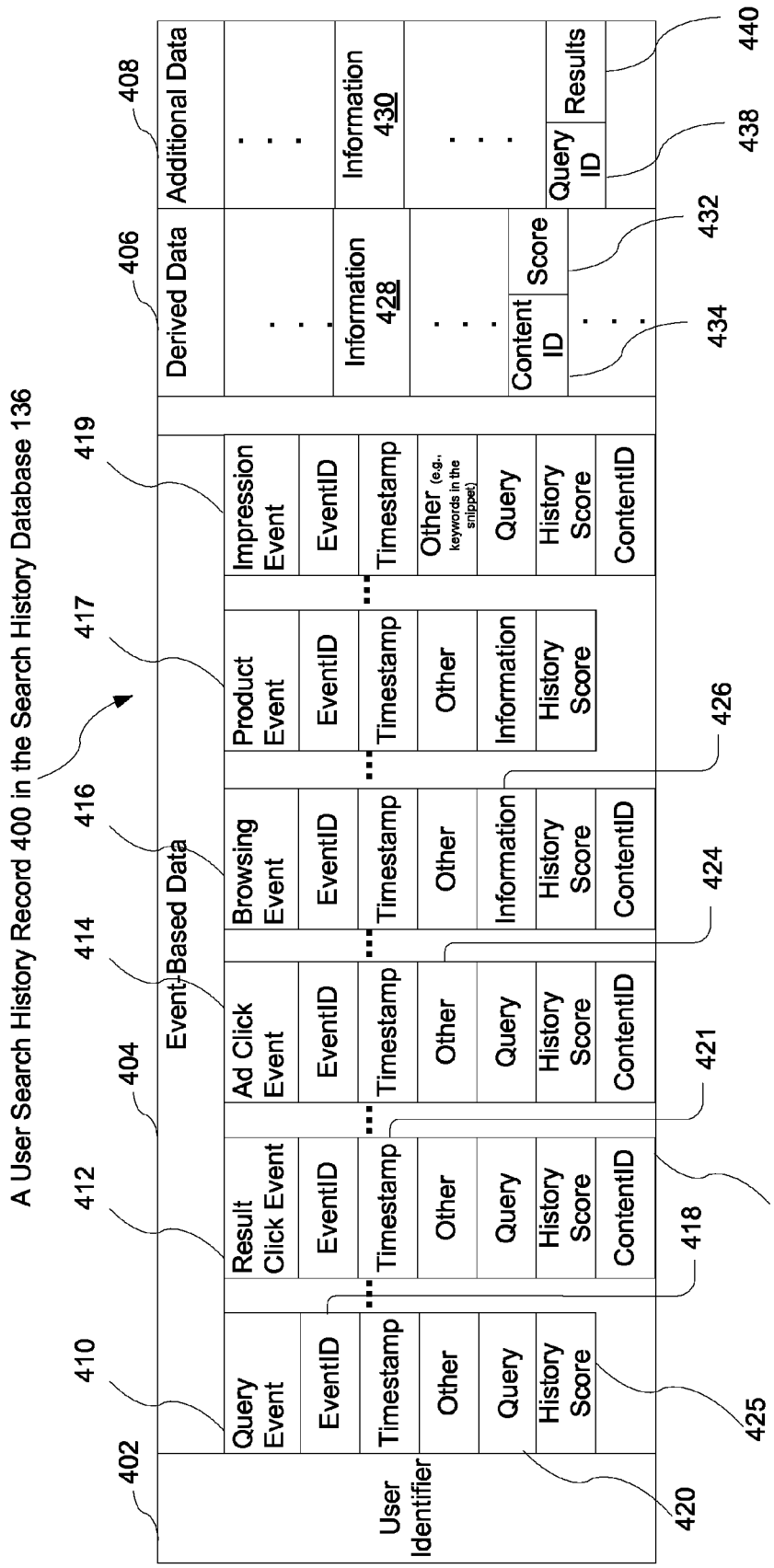
FIG. 4 is a block diagram of data structures associated with the information server, in accordance with some embodiments.

FIG. 4 depicts an exemplary user search history record 400 in the search history database 134 (FIG. 1) according to some embodiments. As noted above, data in the search history database 134 is analyzed by the training data collector 350 (FIG. 3B). In some embodiments, the search history database 134 contains a subset or a superset of the elements depicted in FIG. 4. The user search history record 400 contains a user identifier 402 that uniquely identifies a particular user. In some embodiments, the user identifier 402 is associated with a particular instance of a client application. In some other embodiments, the user identifier 402 is associated with an actual user. Some of the information that can be associated with a user's search history includes event-based data 404, derived data 406, and additional data 408.

In some embodiments, the event-based data 404 includes:
   one or more query events 410, each corresponding to a search query submitted by the user to a search engine;
   one or more result click events 412; a respective result click event 412 corresponds to user selection of a URL link presented in a set of search results;
   one or more sponsored link click events 414 (also called advertisement link click events or ad click events); a respective sponsored link click event 414 corresponds to an item of sponsored content, such as an advertisement, that the user has visited by clicking on or otherwise selecting a link (sometimes called a "sponsored link") to the sponsored content;
   one or more browsing events 416; a respective browsing event 416 corresponds to a document that the user has visited after clicking a URL link to the document;
   one or more product events 417; a respective product event 417 corresponds to product information, such as a set of product reviews, viewed by the user; and
   one or more impression events 419; a respective impression event corresponds to the set of search results presented to a user in response to a search query.

In some embodiments, some of the event-based data 404 (e.g., the sponsored link click events 414) is used for user profile generation. Each type of event-based data 404 includes one or more elements relevant to the event, such as an EventID 418 and a Timestamp 421. The EventID 418 is a unique identifier (e.g., a 64-bit binary number) that is associated with a particular event. The Timestamp 421 is a value (e.g., a 64-bit binary number) that represents the date and/or time at which the particular event record in event-based data 404 was created or at which the particular event occurred.

In some embodiments, one or more of the query events 410, one or more of the result click events 412, one or more of the sponsored link click events 414, and one or more of the impression events 419 include a query portion 420 that includes (or references) one or more query terms associated with the recorded events. Alternately, as shown in FIG. 4, the query portion 420 for events other than query events may comprise the event ID 418 of a query event 410 instead of a set of query terms.

In some embodiments, one or more of the result click events 412, one or more of the sponsored link click events 414, one or more of the browsing events 416, and one or more of the impression events 419 include a ContentID 422 that identifies the content associated with the particular event. For example, the ContentID 422 in a sponsored link click event 414 represents a unique identifier of the particular sponsored link. For a result click event 412, the ContentID 422 represents the URL link in the search results that has been clicked by the user. For a browsing event 416, the ContentID 422 is a document identifier (e.g., a content fingerprint) that identifies a document that has been browsed by the user. In some embodiments, the ContentID 422 may be used to retrieve a copy of the document from a document repository (e.g., the search engine content database 132).

In some embodiments, one impression event 419 corresponds to a list of search results provided to a requesting user. The list of search results may be displayed all together in a single webpage or divided into multiple sub-lists, each sub-list being displayed in a respective webpage. Through its associated query event ID 418, an impression event 419 is directly linked to a query event 410 and indirectly linked to zero or more result click events 412, zero or more sponsored link click events 414, and zero or more browsing events 416.

In some embodiments, the event-based data 404 has a history score 425. A particular event's history score 425 may be calculated in multiple ways or combinations thereof. For example, the history score 425 may be a time-based ranking value that may be periodically updated (e.g., decreased) based on a length of time that has elapsed since the event was recorded. In some embodiments, the history score 425 is determined in response to a request instead of being determined during batch or off-line processing. In some embodiments, a particular event having a history score 425 below a threshold may be deleted. In some other embodiments, an event is always kept in a user's search history record regardless of its history score.

In some embodiments, certain information related to a particular event is stored in an "other" field 424 of the event. For example, the other field 424 of the impression event 419 may include the number of search results within a search result list and their positions in the list as well as one or more text snippets displayed to the user for one or more respective search results, and optionally one or more sets of keywords associated with one or more respective search results. The other field 424 of the result click event 412 may include a user-selected search result's position in the corresponding list of search results. From these two fields, it is possible to determine the search results above and below the user-selected search result in the search result list.

In some embodiments, the browsing events 416 indicate a browsing event not associated with a query, but instead, with some other user activity. This other user activity (e.g., using an email application, browser application, etc.) can be identified in an information field 426.

In some embodiments, the derived data 406 includes one or more information fields 428 containing information derived from the event-based data 404. For example, one information field 428 may represent a user profile that is generated from one or more of the user's query events 410, results click events 412, sponsored link click events 414, browsing events 416, and impression events 419. In some embodiments, the user profile is also stored in the user profile database 136.

In some embodiments, the derived data 406 includes one or more data pairs (ContentID 434, Score 432). The Score 432 represents a ranking score assigned to the content (e.g., a webpage) identified by the ContentID 434. The Score 432 may be dependent upon the number of events (including result click events, sponsored link click events, browsing events, and impression events) associated with the ContentID 434 and generated over a predefined time period. In some embodiments, the Score 432 incorporates a document "dwell time." In some embodiments, a respective document's dwell time is determined by the search result assistant 236, by measuring the amount of time between the user selection of the corresponding URL link and the user exiting from the document. In some embodiments, the Score 432 incorporates a length of time since the last user view of the content. In some embodiments, the Score 432 is negatively affected if the user is presented a URL link to the document in a series of search results but fails to select the URL link. In some embodiments, the Score 432 is positively affected when the user clicks URL links for documents having similar content. Content similarity can be determined by a number of well known techniques (e.g., text classifier, ODP categorization, link structure, URL, edit distance, etc.). In some embodiments, the Score 432 incorporates the number of past search queries from the user for which the content or related content were presented.

In some embodiments, the additional data 408 includes information about the user (e.g., in one or more information fields 430) that is not necessarily represented in the event-based data 404 or the derived data 406. For example, a user may add keywords in the user's bookmarks indicating that a particular URL is helpful or pertained to certain information of interest to the user. An information field 430 may identify the keywords and the URL to which it pertains. In some embodiments, a user may indicate certain topics of interest to the user; information identifying such topics may be stored in the information field 430. In some embodiments, a user may modify a ranking score for a particular document (e.g., a URL, a website, or a sponsored link) in an information field 430. In some embodiments, the additional data 408 includes one or more pairs of (QueryID 438, Result 440) that identify search results associated with a particular query. In some embodiments, the Results 440 include (or include references to) one or more Impression Events 419, indicating which search results were presented or displayed to the user.

The information server 106 (FIG. 1) updates the user search history record 400, e.g., after processing a new search query from the user. In some embodiments, there is a predefined amount of storage space for each user search history record 400. If the space has been filled, the search history database 134 (FIG. 1) may evict some of the oldest search history data in the user search history record 400 to "make room" for new data, e.g., first in first out (FIFO).

As illustrated in FIG. 4, a user's search history may include a timestamp indicating the time that a user submits a search query (t0), a timestamp indicating the time that the user clicks the first URL link in the list of search results (t1), and yet another timestamp indicating the time that the user clicks the second URL link in the list of search results (t2), etc. The differences between two consecutive times (e.g., t1-t0 or t2-t1) are reasonable approximations of the amount of time the user spent viewing the list of search results or the document corresponding to the first URL link that was selected by the user. In some other embodiments (e.g., where at least some users "opt in" to a version of the search result assistant that collects additional information about the users' online activities), the user's search history also includes user click and timestamp information for user activities on the document selected by the user.

In some embodiments, the user's search history further includes a timestamp indicating the time that the user submits a second query (t3), a timestamp indicating the time the user clicks a URL link in the second list of search results (t4), and so on. The user's search history may also have data (e.g., a timestamp) recording the time (t5) when the user either closes the browser window that was being used to view search results and documents associated with the search results or navigates away from the search results. At least some of the information in the user search history record 400 for a respective user can be used by the user profiler 126 (FIG. 1) to generate a user profile for the user.

Training Data Collector

It is desirable to return search results to a user, in response to a user query, that are more relevant than the results initially produced and ordered by a search engine, by improving the search result ranker 128 (FIG. 1). One way to return more relevant results is by evaluating one or more scoring primitives 352 (FIG. 3B) to determine which ones assign the highest ranks to the most relevant results (for a particular user, or group of users), and then using machine learning to combine those scoring primitives 352 into one or more predicted performance functions 370, and one or more context correlation tables 380. It is desirable for the evaluation of scoring primitives 352 to be done in a way that simulates the real world choices of users. This can be done by using log data, which provides objective evidence of user preferences. Log data can be collected over a long period of time and then accessed immediately when it is needed to evaluate a scoring primitive. Alternately, or in addition, search history data stored in the search history database 134 can be used for the purposes described above.

Figure 5A:
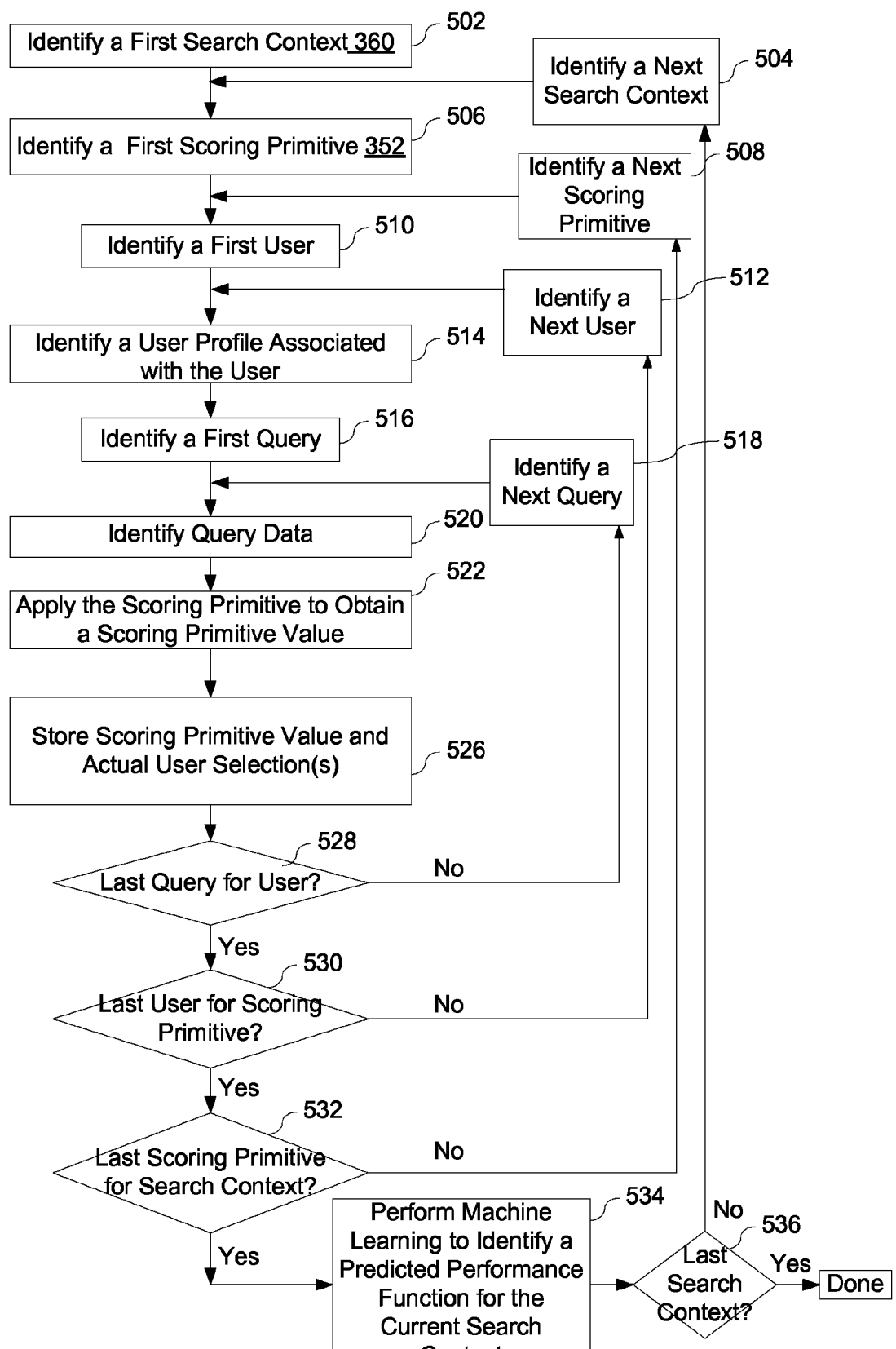
FIG. 5A is a flow chart of a process for generating a plurality of predicted performance functions, each associated with a respective search context, in accordance with some embodiments.

One embodiment of a method of evaluating scoring primitives and combining them into one or more predicted performance functions 370 (FIG. 3B) is illustrated in FIG. 5A. For a given search context (e.g., search context 360-1 (FIG. 3B), selected at 502, 504), the training data collector 350 identifies (506, 508) a plurality of scoring primitives 352, a plurality of users (510, 512), a user profile associated with each user 514, a plurality of search queries (516, 518) and query data associated with each query 520. For a given user and scoring primitive (e.g., 352-1) the training data collector 350 (FIG. 3B) identifies (516, 518) a search query and applies 522 the scoring primitive (e.g., 352-1) to the search query in light of the search context (e.g., 360-1) to obtain a scoring primitive value. This training data, which includes the scoring primitive value and the actual user selection(s) (e.g., click data), is then stored 526 in the training data database 354 (FIG. 3B), described in detail below with reference to FIG. 7. The training data collector 350 (FIG. 3B) repeats this process for each search query from the given user 528, and then repeats the process for each user 530, and for each scoring primitive (e.g., 352-2, . . . , 352-N) 532. In some alternate embodiments, the user and query loops are swapped, with the user loop comprising the inner loop and the query loop comprising the next higher or outer loop.

Figures 5B, 5C:
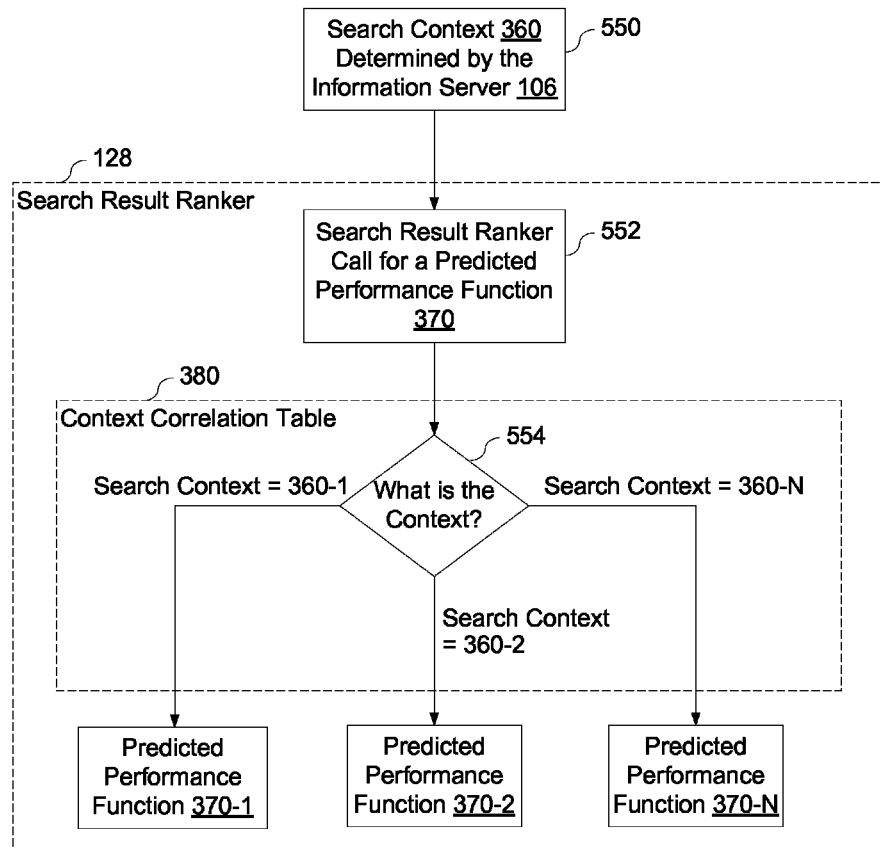
FIG. 5B is a block diagram of an exemplary data structure associated with the information server of FIG. 1.
FIG. 5C is a flow chart of a process for correlating a search query with a predicted performance function, in accordance with some embodiments.

The scoring primitive 352 is applied by the training data collector 350 (FIG. 3B) to search queries categorized by search context 360 (FIG. 3B). Once all scoring primitives 352 in a given search context (e.g., 360-1) have been applied to all of the search queries of all of the users, the training data 354 is sent to a machine learning module 356, where a predicted performance function (e.g., 370-1) is identified 534 for the current search context (e.g., 360-1). The identified predicted performance function (e.g., 370-1) is placed in a context correlation table 380, associated with the current search context (e.g., 360-1). One embodiment of such a correlation table 380 is shown in FIG. 5B. This process is repeated 536 for each search context (e.g., 360-2, . . . , 360-N). The use of machine learning to generate a function based on historical data, for example to identify weights for potential factors in a function, is well known in the art and is therefore not described in detail in this document.

One embodiment of a method for retrieving a predicted performance function 370 (FIG. 3B) when a query from the user (also called a search query) is received is illustrated in FIG. 5C. In this embodiment, when a user query is received at the information server 106, the search context 360 (FIG. 3B) is determined 550 by the information server 106 (FIG. 1). For example, this function may be performed by the search result ranker 128, or by a search context analyzer (not shown) that determines the search context for a given query from a given user. This search context 360 (FIG. 3B) is then sent to the search result ranker 128 (FIG. 1), the search result ranker 128 (FIG. 1) makes a call 552 to the context correlation table 380 (FIG. 3B), where the call includes the relevant search context (e.g., 360-1). The context correlation table 380 returns the predicted performance function (e.g., 370-1) associated with the search context (e.g., 360-1). The search result ranker 128 may then use this predicted performance function (e.g., 370-1) to re-rank the search results, as described in more detail below, with reference to FIG. 8.

Figure 6A:
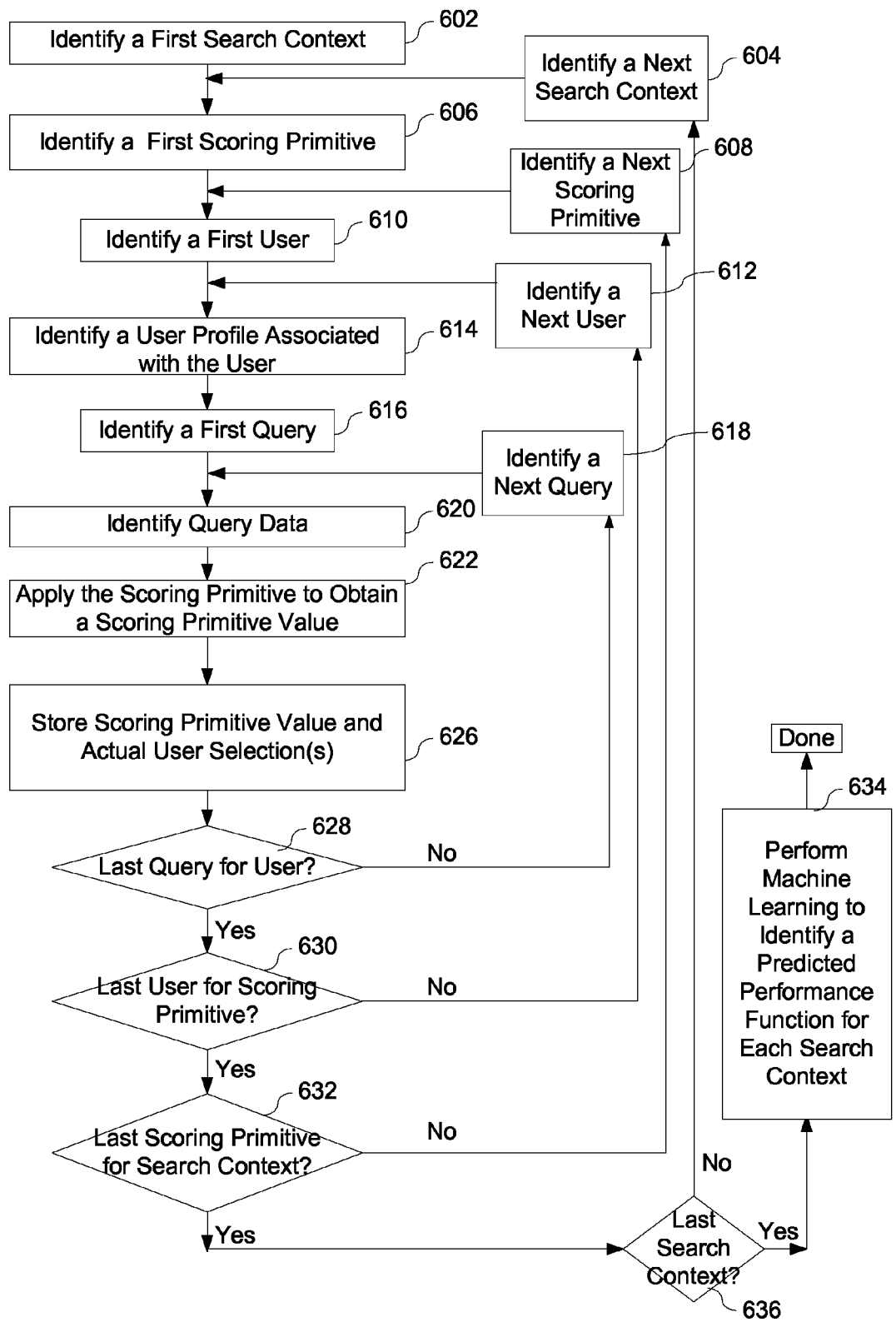
FIG. 6A is a flow chart illustrative of a process for generating a predicted performance function and a plurality of relevance factor sets, in accordance with some embodiments.

Another embodiment of a method of evaluating scoring primitives and combining them into one or more predicted performance function(s) 370 (FIG. 3B) is illustrated in FIG. 6A. For a given search context (e.g., search context 360-1, selected at 602, 604), the training data collector 350 identifies (606, 608) a plurality of scoring primitives 352, a plurality of users (610, 612), a user profile associated with each user 614, a plurality of search queries (616, 618) and query data associated with each query 620. For a given user and scoring primitive (e.g., 352-1) the training data collector 350 (FIG. 3B) identifies (616, 618) a search query and applies 622 the scoring primitive (e.g., 352-1) to the search query in light of the search context (e.g., 360-1). This training data is then stored 626 in the training data database 354, described in detail below with reference to FIG. 7. The training data collector 350 repeats this process for each search query from the given user 628, and then repeats the process for each user 630, and for each scoring primitive (e.g., 352-2, . . . , 352-N) 632. In some alternate embodiments, the user and query loops are swapped, with the user loop comprising the inner loop and the query loop comprising the next higher or outer loop.

In FIG. 6A, the scoring primitive 352 (FIG. 3B) is applied by the training data collector 350 to search queries categorized by search context 360. Once all scoring primitives 352 in a given search context (e.g., 360-1) have been applied to all of the search queries of all of the users, the training data collector 350 repeats the process for each search context (e.g., 360-2, . . . , 360-N) 636. Once this process has been repeated for each search context 360, the training data 354 is sent 634 to a machine learning module 356, where a predicted performance function 370 is identified. Additionally a relevance factor set 374 is identified by the machine learning module 356 for each current search context (e.g., 360-1). Each identified relevance factor set (e.g., 374-1, FIG. 6B) is placed in a context correlation table 380, associated with the current search context (e.g., 360-1). One embodiment of such a correlation table is shown in FIG. 6B.

Figures 6B, 6C:
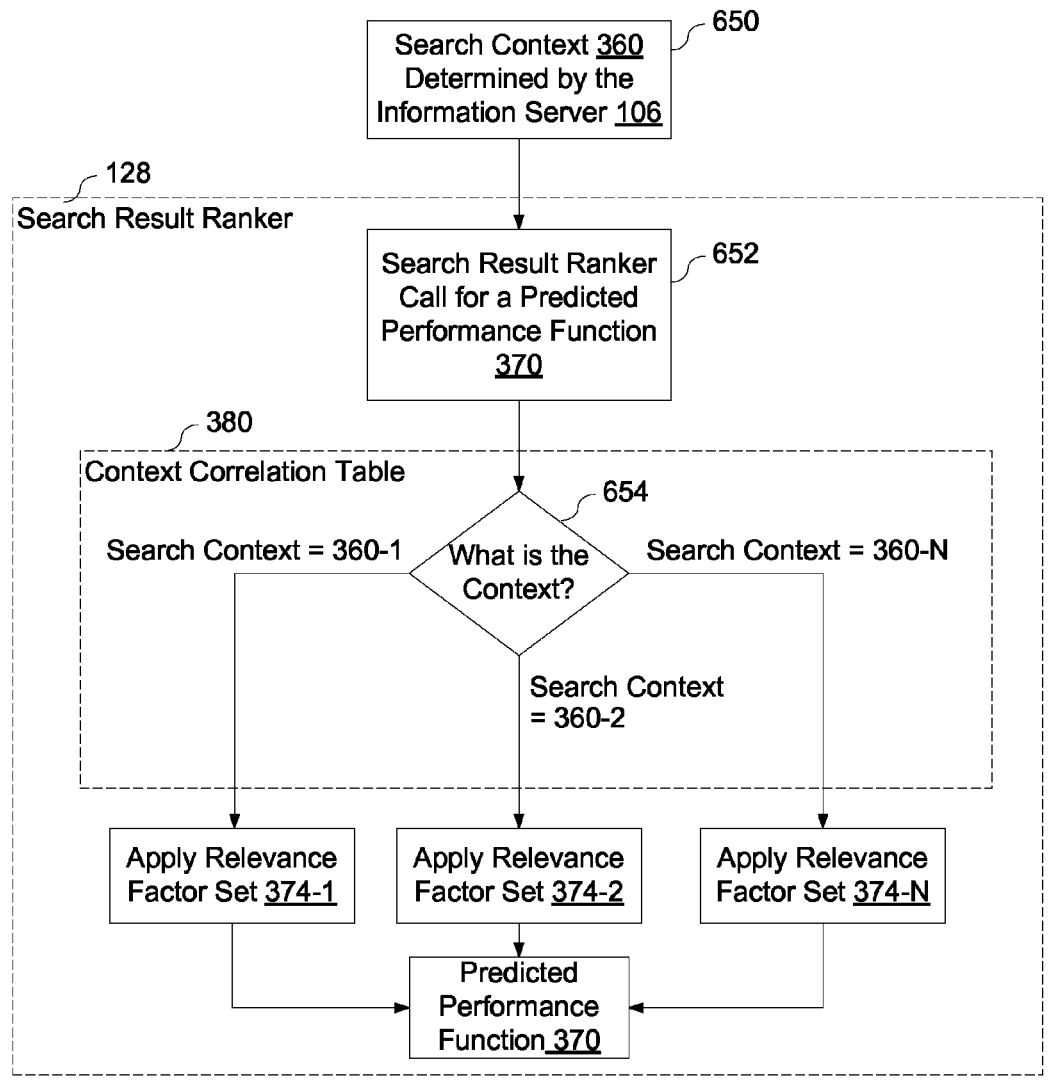
FIG. 6B is a block diagram of an exemplary data structure associated with the information server of FIG. 1.
FIG. 6C is a flow chart of a process for identifying a search context and determining a relevance factor set to be used in a predicted performance function, in accordance with some embodiments.

One embodiment of a method for retrieving a predicted performance function 370 (FIG. 3B) when a query from the user (also called a search query) is received is illustrated in FIG. 6C. In this embodiment, when a user query is received at the information server 106, the search context 360 is determined 650 by the information server 106. For example, this function may be performed by the search result ranker 128, or by a search context analyzer (not shown) that determines the "search context for a given query from a given user." This search context 360 is then sent to the search result ranker 128, the search result ranker 128 makes a call 652 to the context correlation table 380, where the call includes the relevant search context (e.g., 360-1). The context correlation table 380 then returns the relevance factor set (e.g., 374-1) associated with the search context (e.g., 360-1). The search result ranker 128 may then use this predicted performance function (e.g., 370-1) as modified by the relevance factor set (e.g., 374-1) to re-rank the search results, as described in more detail below, with reference to FIG. 8.

As described above, in some embodiments a method of processing a search query includes, for each search context of a plurality of search contexts, for each scoring primitive of a plurality of scoring primitives, and for a set of previously executed search queries that are consistent with the search context, determining a correlation between the scoring primitive and actual user selections of results of the previously executed search queries by a plurality of users. Machine learning is performed on the correlations to identify a predicted performance function comprising a weighted subset of the scoring primitives that meet predefined predictive quality criteria. The method furthermore includes receiving and executing a user submitted search query to produce a set of search results, including associating the user submitted search query with a respective search context of the plurality of search contexts, and ordering at least a portion of the search results in accordance with the identified predicted performance function and the search context associated with user submitted search query.

In another aspect of the invention, a system includes one or more processors, memory, and one or more programs stored in the memory to be executed by the one or more processors. The one or more programs include instructions for processing a search query, including instructions for determining a correlation, for each search context of a plurality of search contexts, for each scoring primitive of a plurality of scoring primitives, and for a set of previously executed search queries that are consistent with the search context, between the scoring primitive and actual user selections of results of the previously executed search queries by a plurality of users. The one or more programs further include instructions for performing machine learning on the correlations to identify a predicted performance function comprising a weighted subset of the scoring primitives that meet predefined predictive quality criteria. The one or more programs also include instructions for receiving and executing a user submitted search query, submitted by a user, to produce a set of search results, including associating the user submitted search query with a respective search context of the plurality of search contexts, and ordering at least a portion of the search results in accordance with the identified predicted performance function and the search context associated with user submitted search query.

Figure 7:
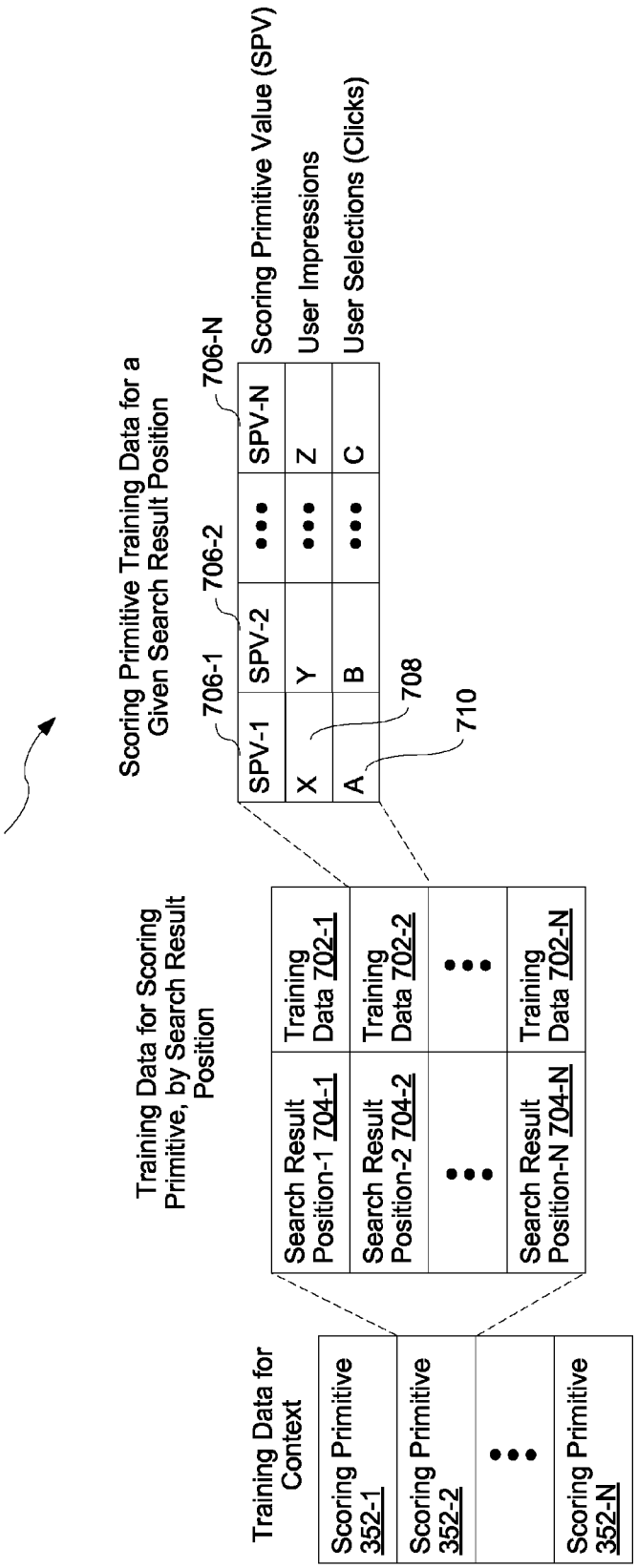
FIG. 7 is a block diagram of data structures associated with a training data collector, in accordance with some embodiments.

FIG. 7 is a block diagram of an exemplary data structure for the training data database 354 (FIG. 3B) that is collected by the training data collector 350 (FIG. 3). For each scoring primitive (e.g., scoring primitive-2 352-2), training data (e.g., 702-2) is stored in association with search result position (e.g., 704-2). The training data (e.g., 702-2) is a set of scoring primitive values (e.g., SPV-1 706-1), which are associated with the number of user impressions (e.g., "X" 708) and the number of user selections (e.g., "A" 710) that were made by users of the result in that position (e.g., Search Result Position-2 704-2). As described previously, this data is collected for each user and each query that the scoring primitive (e.g., 352-2) was applied to. In some embodiments, a higher scoring primitive value for a result (where SPV-1 706-1 is higher than SPV-2 706-2, and SPV-N 706-N is the lowest scoring primitive value) indicates that the user is more likely to click on the result, and thus that it should be moved towards the top of the list of search results. In some embodiments, each scoring primitive "value" (e.g., SPV-N) may represent a range of values that are output by the scoring primitive.

It is desirable that scoring primitives provide more relevant results to the user (i.e., results that are more likely to be clicked on are closer to the top or head of the list of results). Thus, each of the scoring primitives must meet predefined predictive quality criteria. In some embodiments, these predefined predictive quality criteria are a measure of the correlation between the scoring primitive values and the user click through rate (CTR). The user click through rate (CTR) is calculated dividing the number of user impressions of a document (e.g., "X" 708) by the number of user selections (as described previously with reference to FIG. 2B) of a document (e.g., "A" 710).

Once the one or more scoring primitives 352 that meet the predefined predictive criteria have been identified and combined by the machine learning module 356 into one or more predicted performance functions 370, the predicted performance function(s) 370 are stored in the information server 106 memory 312 within the search result ranker 128.

In some embodiments, a respective predicted performance function 370 is executed to generate (or evaluated to determine) a predicted click through rate (CTR) for a respective search result, at each of a plurality of search result positions (e.g., the first, second third positions in the search result list) in accordance with the search context. The resulting CTR values for each of a plurality of the search results are then used to determine if re-ranking or re-ordering the search results would improve the quality of the search results sent to the requester. An improvement in the quality of the search results may be indicated by an increase in the predicted click through rates for the top N (e.g., the top 3, 5 or 10, or any other suitable value of N, where N is typically less than or equal to 25) search results to be presented to the user. The search results are then re-ordered in accordance with the predicted CTR values if such re-ordering would improve the predicted quality of the search results.

Search Results Re-Ranking

Figure 8:
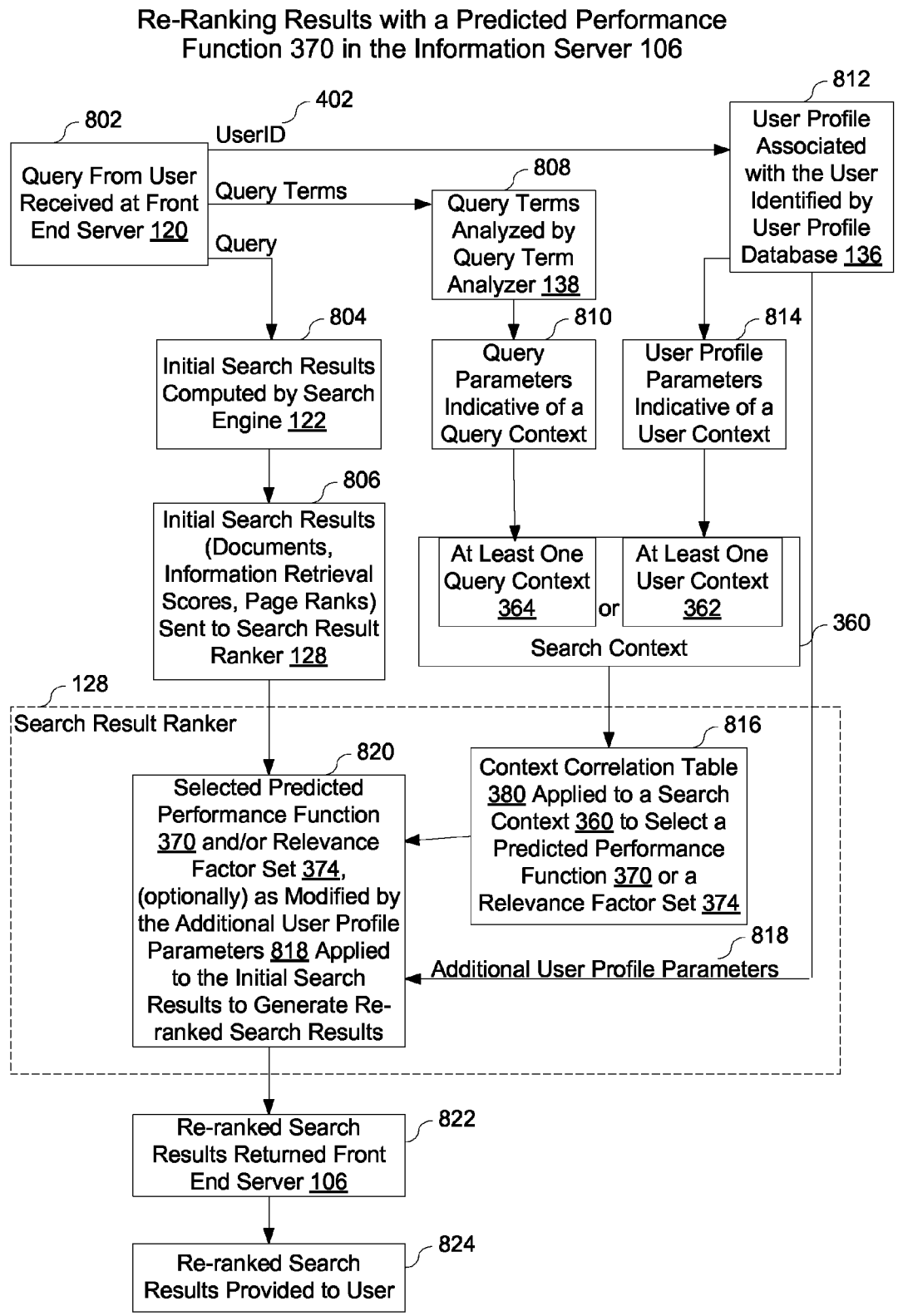
FIG. 8 is a flow chart of a process for re-ranking a set of search results using a predicted performance function, in accordance with some embodiments.

FIG. 8 is a flow chart illustrative of a process for receiving and executing a user submitted search query, submitted by a user and providing search results to the user. At least a portion of the above mentioned search results are ranked in accordance with the identified predicted performance function (e.g., 370-1) associated with the search context (e.g., 360-1), or with the predicted performance function 370 and the relevance factor set 374 associated with the search context (e.g., 360-1).

In some embodiments, the query from the user is received 802 by the front end server 120 (FIG. 1). The front end server 120 sends the query to the search engine 122 (FIG. 1), which computes 804 initial search results (i.e., documents, information retrieval scores and Page Ranks) and then sends 806 the initial search results to the search result ranker 128 (FIG. 1). The front end server 120 also sends a set of query terms to the query analyzer 138 (FIG. 1), which analyzes 808 the query terms and identifies a set of parameters 810 indicative of the query context 364 (FIG. 3B) (e.g., the vagueness of the query or terms indicating the type of query, such as a "commercial" query). The front end server 120 also sends the UserID 402 (FIG. 4) to the user profile database 136, which identifies 812 a set of parameters 814 indicative of the user context 362 (FIG. 3B) (e.g., user group, country, language, etc.). The user context 362 and the query context 364 (collectively the search context 360) are received by the search result ranker 128. The search result ranker 128 applies the context correlation table 380 to the search context 360 in order to select 816 a predicted performance function 370 or relevance factor set 374. The predicted performance function may optionally be further modified by additional user profile parameters 818 from the user profile.

In some embodiments, the search result ranker 128 then applies the selected predicted performance function (e.g., 370-1) or the predicted performance function 370 and selected relevance factor set 374 (which may be optionally modified by additional user profile parameters 818 from the user profile) to the initial search results in order to generate 820 re-ranked results. For each search result, the search result ranker 128 may move a respective search result from its current position to a new position in the list based at least in part on the user click through rates (of the search result at each of a plurality of search result positions) predicted by the performance function (e.g., 370-1) associated with the search context (e.g., 360-1). Assuming that at least one search result changes its position, the search result ranker 128 then returns 822 the re-ranked or re-ordered list of search results (142, FIG. 3A) to the front end sever 120. The front end server 120 then provides 824 the reordered list of search results to the requesting user at the client 103. In some embodiments, a portion of the reordered list of search results (e.g., the top 10, 15 or 20 search results) is returned to the client 103 and displayed to the requesting user through the client application 234. The requesting user, while browsing the displayed search results, may click one or more URL links in the search results to access the documents associated with the URL links.

In sum, the search result ranker 128 customizes the list of search results originally ordered by their generic ranking scores such that search results that the predicted performance function 370 indicates are likely be more relevant to the user are moved to more prominent positions within the list of search results (e.g., a higher position in a webpage displaying the list of search results) and are therefore more likely to be noticed by the user. Because different users have different user profiles and different search contexts 360, they may receive differently ordered lists of search results when submitting the same search query to the information server 106.

The following is a prophetic example of a search query, a search context comprising a query context and user context (including both recently history information and user profile information), initial search results, and re-ranked search result produced in accordance with a predicted performance function that is associated with the search context.

Prophetic Example

Search query: [nola]
Query context: ambiguity: high; commercial: low
User context:
   Recently submitted search queries and user clicks:
     1. query: [stanford news], click: http://daily.stanford.edu;
     2. query: [palo alto auto care];
     ...
   user profile:
   interests 1: stanford university
   interests 2: bay area-peninsula
   ...
Initial Results:
   1. NOLA.com: Everything New Orleans www.nola.com/2.
   2. emerils.com | NOLA Restaurant www.emerils.com/restaurants/neworleans_nola/3.
   3. Nola Restaurant - - - Palo Alto, Calif. www.nolas.com/4.
   4. Nola—Wikipedia, the free encyclopedia en.wikipedia.org/wiki/Nola Re-ranked results:
   1. Nola Restaurant - - - Palo Alto, Calif. www.nolas.com/2.
   2. NOLA.com: Everything New Orleans www.nola.com/3.
   3. emerils.com | NOLA Restaurant www.emerils.com/restaurants/neworleans_nola/4.
   4. Nola—Wikipedia, the free encyclopedia en.wikipedia.org/wiki/Nola The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing a search query, comprising:
at a computer system having one or more processors and memory storing one or more programs executed by the one or more processors:
for each search context of a plurality of search contexts,
for each scoring primitive of a plurality of scoring primitives,
for a set of previously executed search queries that are consistent with the search context, determining a correlation between the scoring primitive and actual user selections of results of the previously executed search queries by a plurality of users; and
for each search context, performing machine learning on the correlations to identify a predicted performance function comprising a weighted subset of the scoring primitives that meet predefined predictive quality criteria, wherein the identified predicted performance function is associated with the search context; and
receiving and executing a user submitted search query, submitted by a user, to produce a set of search results, including associating the user submitted search query with a respective search context of the plurality of search contexts, and ordering at least a portion of the search results in accordance with the identified predicted performance function for the search context associated with the user submitted search query.

2. The method of claim 1, wherein each search context is associated with a respective group of users.

3. The method of claim 2, wherein the group of users for a respective search context is determined based on at least one user attribute selected from the group consisting of user language and user country.

4. The method of claim 1, wherein each search context is associated with a respective group of users and a respective class of search queries.

5. The method of claim 4, wherein the respective class for a particular search query is determined in accordance with a number of search terms in the particular search query.

6. The method of claim 4, wherein the respective class for a particular search query is a query type determined in accordance with one or more of the terms of the particular search query.

7. The method of claim 1, wherein associating the user submitted search query with a respective search context includes associating one or more parameters of a user profile of the user with a respective search context of the plurality of search contexts.

8. The method of claim 1, wherein ordering at least a subset of the search results includes evaluating the identified predicted performance function, for each of a plurality of the search results, using one or more parameters of a user profile of the user.

9. The method of claim 1, including evaluating the identified predicted performance function with respect to a particular search result at a plurality of potential search result positions to produce values, corresponding to predicted user click through rates, for each position in the plurality of potential search result positions.

10. The method of claim 1, wherein:
the set of search results has a preliminary search result order; and
ordering the portion of the search results in accordance with the identified predicted performance function includes:
comparing predicted click through rates of a plurality search results in multiple different search result orders;
selecting a respective search result order that increases a predicted click through rate of a plurality of the results over the preliminary search result order; and
ordering the portion of the search results in the respective search result order.

11. The method of claim 10, wherein:
the preliminary sort order is a user-independent sort order based on relevance of the search results to the search query; and
the respective sort order is a user-dependent sort order based on a user profile of the user.

12. The method of claim 1, wherein identifying the predicted performance function includes performing machine learning on a correlation between the scoring primitives and other user activities on the results of the previously executed search queries in addition to actual user selections of results of the previously executed search queries.

13. The method of claim 12, wherein the other user activities on the results of the previously executed search queries are interactions selected from the set consisting of:
a dwell time corresponding to an amount of time between the user opening a respective document corresponding to a respective search result of a respective previously executed search query and the user exiting from the respective document;
hovering over a respective search result of a respective previously executed search query; and
bookmarking a resource location corresponding to a respective search result of a respective previously executed search query.

14. A system, comprising:
one or more processors;
memory;
one or more programs stored in the memory to be executed by the one or more processors, the one or more programs comprising:
instructions for determining a correlation, for each search context of a plurality of search contexts, for each scoring primitive of a plurality of scoring primitives, and for a set of previously executed search queries that are consistent with the search context, between the scoring primitive and actual user selections of results of the previously executed search queries by a plurality of users;
instructions for performing machine learning, for each search context, on the correlations to identify a predicted performance function comprising a weighted subset of the scoring primitives that meet predefined predictive quality criteria, wherein the identified predicted performance function is associated with the search context; and
instructions for receiving and executing a user submitted search query, submitted by a user, to produce a set of search results, including associating the user submitted search query with a respective search context of the plurality of search contexts, and ordering at least a portion of the search results in accordance with the identified predicted performance function for the search context associated with the user submitted search query.

15. The system of claim 14, wherein each search context is associated with a respective group of users.

16. The system of claim 15, wherein the group of users for a respective search context is determined based on at least one user attribute selected from the group consisting of user language and user country.

17. The system of claim 14, wherein each search context is associated with a respective group of users and a respective class of search queries.

18. The system of claim 17, wherein the respective class for a particular search query is determined in accordance with a number of search terms in the particular search query.

19. The system of claim 17, wherein the respective class for a particular search query is a query type determined in accordance with one or more of the terms of the particular search query.

20. The system of claim 14, wherein associating the user submitted search query with a respective search context includes associating one or more parameters of a user profile of the user with a respective search context of the plurality of search contexts.

21. The system of claim 14, wherein ordering at least a subset of the search results includes evaluating the identified predicted performance function, for each of a plurality of the search results, using one or more parameters of a user profile of the user.

22. The system of claim 14, wherein the one or more programs include instructions for evaluating the identified predicted performance function with respect to a particular search result at a plurality of potential search result positions to produce values, corresponding to predicted user click through rates, for each position in the plurality of potential search result positions.

23. The system of claim 14, wherein:
the set of search results has a preliminary search result order; and
ordering the portion of the search results in accordance with the identified predicted performance function includes:
comparing predicted click through rates of a plurality search results in multiple different search result orders;
selecting a respective search result order that increases a predicted click through rate of a plurality of the results over the preliminary search result order; and
ordering the portion of the search results in the respective search result order.

24. The system of claim 23, wherein:
the preliminary sort order is a user-independent sort order based on relevance of the search results to the search query; and the respective sort order is a user-dependent sort order based on a user profile of the user.

25. The system of claim 14, wherein identifying the predicted performance function includes performing machine learning on a correlation between the scoring primitives and other user activities on the results of the previously executed search queries in addition to actual user selections of results of the previously executed search queries.

26. The system of claim 25, wherein the other user activities on the results of the previously executed search queries are interactions selected from the set consisting of:
   a dwell time corresponding to an amount of time between the user opening a respective document corresponding to a respective search result of a respective previously executed search query and the user exiting from the respective document;
   hovering over a respective search result of a respective previously executed search query; and
   bookmarking a resource location corresponding to a respective search result of a respective previously executed search query.

27. A system, comprising:
   one or more processors;
   memory;
   one or more programs stored in the memory to be executed by the one or more processors, the one or more programs comprising:
      instructions for determining a correlation, for each search context of a plurality of search contexts, for each scoring primitive of a plurality of scoring primitives, and for a set of previously executed search queries that are consistent with the search context, between the scoring primitive and actual user selections of results of the previously executed search queries by a plurality of users;
      instructions for performing machine learning on the correlations to identify a predicted performance function comprising a weighted subset of the scoring primitives that meet predefined predictive quality criteria; and
      instructions for receiving and executing a user submitted search query, submitted by a user, to produce a set of search results, including associating the user submitted search query with a respective search context of the plurality of search contexts, and ordering at least a portion of the search results in accordance with the identified predicted performance function and the search context associated with the user submitted search query.

28. The system of claim 27, wherein each search context is associated with a respective group of users.

29. The system of claim 28, wherein the group of users for a respective search context is determined based on at least one user attribute selected from the group consisting of user language and user country.

30. The system of claim 27, wherein each search context is associated with a respective group of users and a respective class of search queries.

31. The system of claim 30, wherein the respective class for a particular search query is determined in accordance with a number of search terms in the particular search query.

32. The system of claim 30, wherein the respective class for a particular search query is a query type determined in accordance with one or more of the terms of the particular search query.

33. The system of claim 27, wherein associating the user submitted search query with a respective search context includes associating one or more parameters of a user profile of the user with a respective search context of the plurality of search contexts.

34. The system of claim 27, wherein ordering at least a subset of the search results includes evaluating the identified predicted performance function, for each of a plurality of the search results, using one or more parameters of a user profile of the user.

35. The system of claim 27, wherein the one or more programs include instructions for evaluating the identified predicted performance function with respect to a particular search result at a plurality of potential search result positions to produce values, corresponding to predicted user click through rates, for each position in the plurality of potential search result positions.

36. The system of claim 27, wherein:
   the set of search results has a preliminary search result order; and
   ordering the portion of the search results in accordance with the identified predicted performance function includes:
      comparing predicted click through rates of a plurality search results in multiple different search result orders;
      selecting a respective search result order that increases a predicted click through rate of a plurality of the results over the preliminary search result order; and
      ordering the portion of the search results in the respective search result order.

37. The system of claim 36, wherein:
   the preliminary sort order is a user-independent sort order based on relevance of the search results to the search query; and
   the respective sort order is a user-dependent sort order based on a user profile of the user.

38. The system of claim 27, wherein identifying the predicted performance function includes performing machine learning on a correlation between the scoring primitives and other user activities on the results of the previously executed search queries in addition to actual user selections of results of the previously executed search queries.

39. The system of claim 38, wherein the other user activities on the results of the previously executed search queries are interactions selected from the set consisting of:
   a dwell time corresponding to an amount of time between the user opening a respective document corresponding to a respective search result of a respective previously executed search query and the user exiting from the respective document;
   hovering over a respective search result of a respective previously executed search query; and
   bookmarking a resource location corresponding to a respective search result of a respective previously executed search query.

40. A non-transitory computer readable storage medium for storing one or more programs to be executed by one or more processors of a computer system, the one or more programs comprising:
   instructions for determining a correlation, for each search context of a plurality of search contexts, for each scoring primitive of a plurality of scoring primitives, and for a set of previously executed search queries that are consistent with the search context, between the scoring primitive and actual user selections of results of the previously executed search queries by a plurality of users;
   instructions for performing machine learning, for each search context, on the correlations to identify a predicted performance function comprising a weighted subset of the scoring primitives that meet predefined predictive quality criteria, wherein the identified predicted performance function is associated with the search context; and instructions for receiving and executing a user submitted search query, submitted by a user, to produce a set of search results, including associating the user submitted search query with a respective search context of the plurality of search contexts, and ordering at least a portion of the search results in accordance with the identified predicted performance function for the search context associated with the user submitted search query.

41. The non-transitory computer readable storage medium of claim 40, wherein each search context is associated with a respective group of users.

42. The non-transitory computer readable storage medium of claim 41, wherein the group of users for a respective search context is determined based on at least one user attribute selected from the group consisting of user language and user country.

43. The non-transitory computer readable storage medium of claim 40, wherein each search context is associated with a respective group of users and a respective class of search queries.

44. The non-transitory computer readable storage medium of claim 43, wherein the respective class for a particular search query is determined in accordance with a number of search terms in the particular search query.

45. The non-transitory computer readable storage medium of claim 43, wherein the respective class for a particular search query is a query type determined in accordance with one or more of the terms of the particular search query.

46. The non-transitory computer readable storage medium of claim 40, wherein associating the user submitted search query with a respective search context includes associating one or more parameters of a user profile of the user with a respective search context of the plurality of search contexts.

47. The non-transitory computer readable storage medium of claim 40, wherein ordering at least a subset of the search results includes evaluating the identified predicted performance function, for each of a plurality of the search results, using one or more parameters of a user profile of the user.

48. The non-transitory computer readable storage medium of claim 40, wherein the one or more programs include instructions for evaluating the identified predicted performance function with respect to a particular search result at a plurality of potential search result positions to produce values, corresponding to predicted user click through rates, for each position in the plurality of potential search result positions.

49. The non-transitory computer readable storage medium of claim 40, wherein:
the set of search results has a preliminary search result order; and
ordering the portion of the search results in accordance with the identified predicted performance function includes:
comparing predicted click through rates of a plurality search results in multiple different search result orders;
selecting a respective search result order that increases a predicted click through rate of a plurality of the results over the preliminary search result order; and
ordering the portion of the search results in the respective search result order.

50. The non-transitory computer readable storage medium of claim 49, wherein:
the preliminary sort order is a user-independent sort order based on relevance of the search results to the search query; and
the respective sort order is a user-dependent sort order based on a user profile of the user.

51. The non-transitory computer readable storage medium of claim 40, wherein identifying the predicted performance function includes performing machine learning on a correlation between the scoring primitives and other user activities on the results of the previously executed search queries in addition to actual user selections of results of the previously executed search queries.

52. The non-transitory computer readable storage medium of claim 51, wherein the other user activities on the results of the previously executed search queries are interactions selected from the set consisting of:
a dwell time corresponding to an amount of time between the user opening a respective document corresponding to a respective search result of a respective previously executed search query and the user exiting from the respective document;
hovering over a respective search result of a respective previously executed search query; and
bookmarking a resource location corresponding to a respective search result of a respective previously executed search query.

* * * * *